UNITED STATES PATENT OFFICE.

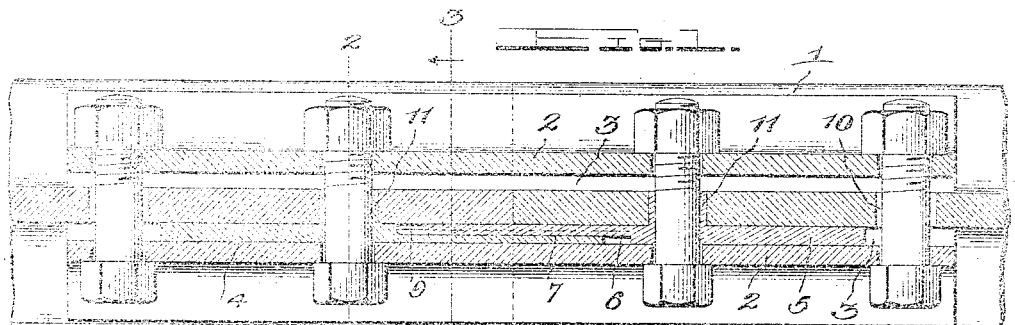
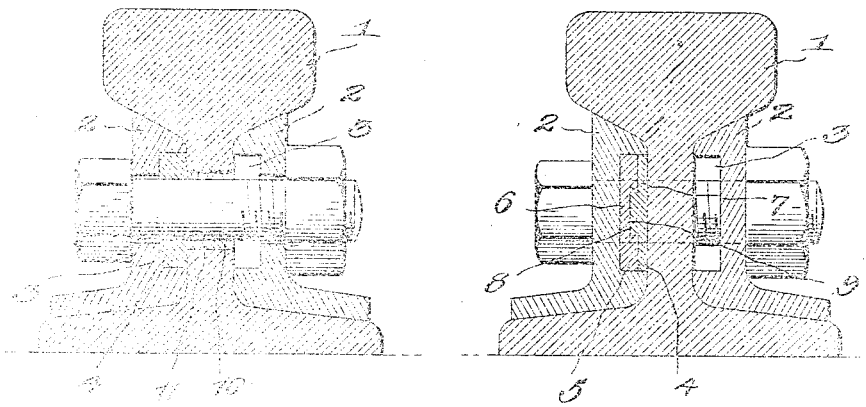
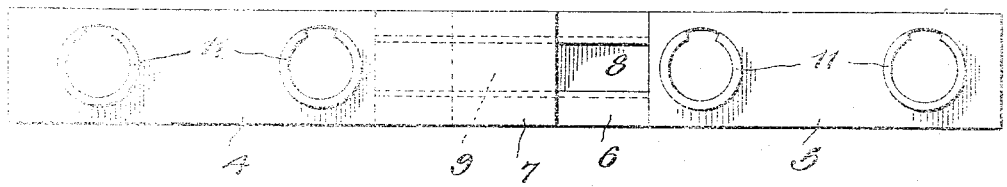

JAMES LINDLEY, OF PROVIDENCE, RHODE ISLAND, ASSIGNOR OF ONE-HALF TO JAMES H. LINDLEY, OF PROVIDENCE, RHODE ISLAND.

RAIL-BOND.

1,167,370.

Specification of Letters Patent.

Patented Jan. 4, 1916.

Application filed April 14, 1914. Serial No. 831,846.

*To all whom it may concern:*

Be it known that I, JAMES LINDLEY, a citizen of the United States, residing at Providence, in the county of Providence and State of Rhode Island, have invented a new and useful Improvement in Rail-Bonds, of which the following is a specification.

This invention relates to certain new and useful improvements in rail bonds, and the primary object thereof is to provide a bond which is completely concealed and protected by the fish plates.

Further, the invention aims to provide a bond which can be easily and quickly adjusted to the bolt apertures of the rail webs, to thus provide for any inequalities in the distances which the bolt apertures of adjacent rails may be spaced in.

Further, the invention aims to provide a bond which is of simple and economical structure and which is held in place by the fish plates, thus eliminating any separate fastening means therefor.

In the drawings Figure 1 is a horizontal sectional view taken through a pair of connected rails to which the present invention is applied. Fig. 2 is a section taken on the line 2—2 of Fig. 1. Fig. 3 is a section taken on the line 3—3 of Fig. 1. Fig. 4 is a front elevation of the bond illustrating same disconnected from the rails.

The rails 1 are connected by the usual fish plates 2, the latter having longitudinal recesses 3 for the purpose of receiving the bond. The bond consists of a pair of plates 4 and 5, which have tongues 6 and 7 that overlap and are reduced in thickness so that when in overlapping relation, the body portions of the plates will extend flush with one another. The tongue 6 is formed with a dovetail recess 8 which receives a dovetail projection 9 formed on the tongue 7 whereby the plates are adjustably connected, due to the sliding relationship borne between the dovetail recess 8 and the dovetail projection 9 of the tongues. This adjustment enables the plates to be easily and quickly moved toward or away from one another to thereby compensate for any inequality which may exist in the distances the bolt apertures 10 are spaced. The plates 4 and 5 are provided with integral split sleeves or bushings 11, which provide electrical contact with the rails, the bushings being projected through the bolt apertures 10, and being split so as to enable contraction thereof in cases where the bolt apertures are not of uniform diameter. As depicted in Fig. 1 of the drawings, the bolts 12 pass through the bushings. Obviously, the plates may be provided with as many bushings as desired, Fig. 1 illustrating but one bushing carried by each plate, while Fig. 4 illustrates two bushings borne by each plate.

In operation, assuming the rails are placed in end to end abutting relation, the plates 4 and 5 are then adjusted by relatively sliding same to cause the bushings to pass through the bolt apertures in the rail webs, after which the fish plates are applied and the bolts passed through the fish plates and bushings, and since the bond is engaged with the inner face of one of the fish plates and received in the recessed part thereof, it will be held in engagement by the fish plate, thus dispensing with the requirement of any separate fastening means for the bond. It will also be evident that a bond may be used on each side of the webs of the adjoining rails, if desired.

Copper is or may be used to form the plates from, or a high grade of brass may be used instead.

Having thus described my invention, I claim as new and desire to secure by Letters Patent:—

1. In a rail bond, a pair of plates each having a tongue of reduced thickness, which tongues overlap, one of the tongues having a dovetail recess and the other tongue having a dovetail projection which is slidably received in the recess whereby said tongues may be adjusted toward or away from each other by sliding same, and a split bushing formed integral with each plate and adapted to be received in the bolt aperture of rail webs, said bond in its entirety being engageable in a recess provided for the reception thereof in the inner face of one of the fish plates and being held in position against the rail webs by said fish plate.

2. In a rail bond, a pair of plates each having a tongue of reduced thickness, which tongues overlap, one of the tongues having a dovetail recess and the other tongue having a dovetail projection slidably engaged in the recess whereby said tongues may be adjusted toward or away from each other by sliding the plates longitudinally.

In testimony whereof I have signed my name to this specification in the presence of two subscribing witnesses.

JAMES LINDLEY.

Witnesses:
ADA E. HAGERTY,
J. A. MILLER.